UNITED STATES PATENT OFFICE.

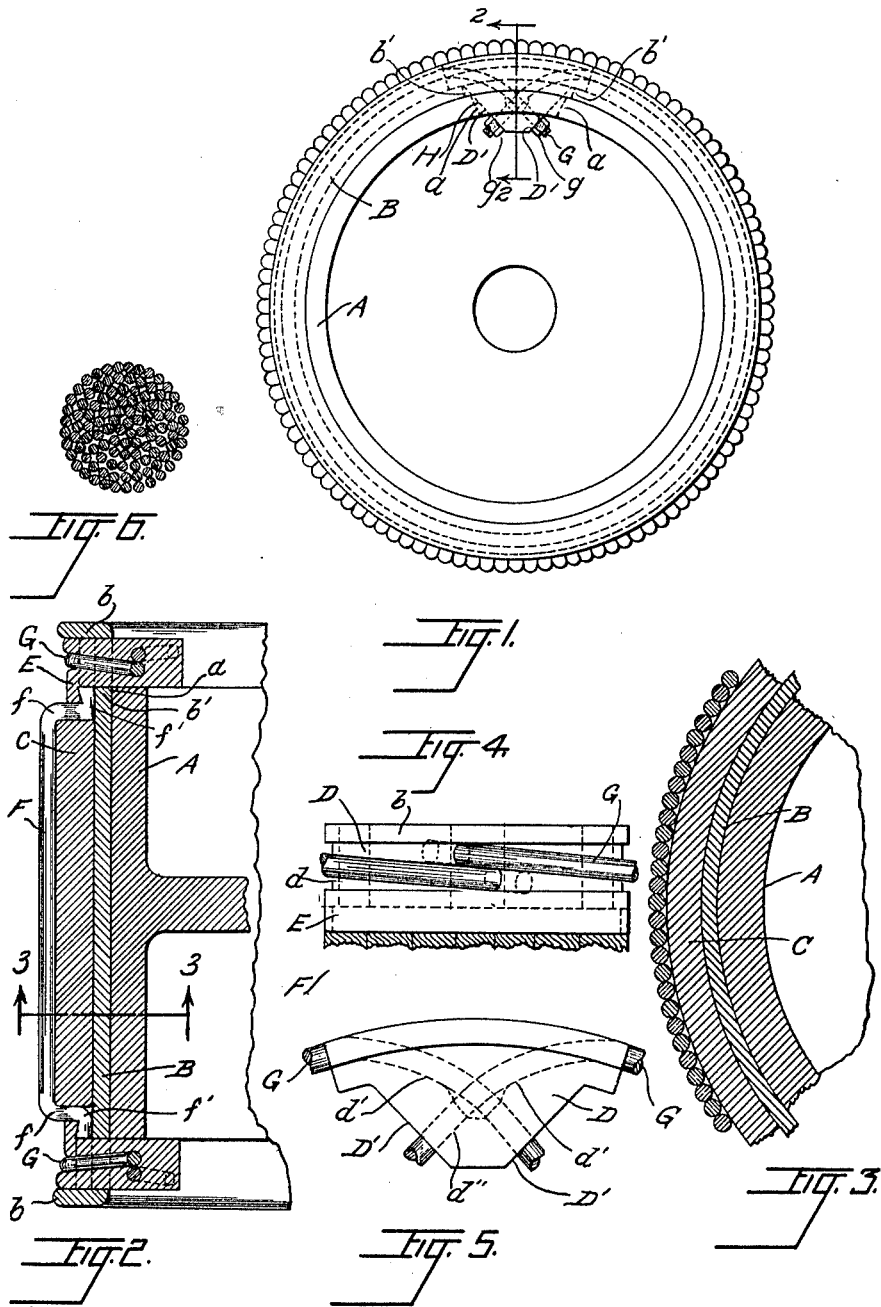

FREDERICK H. LATHROP, OF CHICAGO, ILLINOIS.

TIRE.

1,012,375.  Specification of Letters Patent.  Patented Dec. 19, 1911.

Application filed May 17, 1911. Serial No. 627,719.

*To all whom it may concern:*

Be it known that I, FREDERICK H. LATHROP, a citizen of the United States, residing at Chicago, in the county of Cook and State of Illinois, have invented a new and useful Improvement in Tires, of which the following is a specification.

This invention relates to tires used on trucks or other heavy vehicles; particularly on self propelled vehicles provided with wide fellies to the wheels thereof.

The object of the invention is to obtain a tire which will be durable, with sufficient elasticity to permit its. use on motor truck and other wheels of small diameter and a tire whereof the traction, as it is termed in the art, will be such as to tend to prevent the slipping thereof.

A further object is to obtain a wide, elastic tire which is economical in its initial construction, and which can be economically maintained in efficient working condition for a considerable time by a man of ordinary skill.

In the drawing Figure 1 is a side elevation of the rim of a wheel provided with a tire embodying this invention. Fig. 2 is a sectional view on line 2—2 of Fig. 1, viewed in the direction indicated by the arrow. Fig. 3 is a section on line 3—3 of Fig. 2, viewed in the direction indicated by the arrow. Fig. 4 is a top plan view, on an enlarged scale, of a fastening device forming an element of a tire embodying this invention. Fig. 5 is a side elevation of the fastening device illustrated in Fig. 4. Fig. 6 is a section, on an enlarged scale, of a cable forming an element of the tire embodying the invention.

Similar letters refer to similar parts throughout the several views.

A is the felly of a wheel and is provided with apertures $a$.

B is a metal rim or tire on felly A. Tire B is provided with upturned edges $b$, (forming annular flanges), and with apertures $b'$.

C is a rubber band fitting closely to metal tire B.

D is a block provided with grooves $d$. The block D is set in place on rim B so that the part thereof which is provided with faces D', D', is inserted in apertures $b'$ and $a$ of said rim B and felly A. The bottom of groove $d$ is indicated by the broken lines $d'$ in Fig. 5. Broken lines $d''$ designate apertures or holes extending, respectively from the bottom or lower end of the groove $d$ to faces D', D', of the block D respectively.

E is an overhanging lip to block D, (see Figs. 2 and 4).

F, F, are sections of cable, which are respectively formed of twisted wires. Sections F extend transversely across the peripheral face of rubber band C and they are respectively bent, at substantially right angles, near the ends thereof, to obtain the bends $f$, and $f'$, (see Fig. 2).

G, G, are wires which are fastened at their ends in block D as hereinafter described, and which extend from said block D over the ends of the sections of cable F which are placed over the rubber band C, to hold said sections in place. The ends of these sections of cables F which abut against block D are underneath lip E and are held in place thereby on rubber band. The ends of wires G are in grooves $d$ and extend through apertures $d'$ and are screw threaded.

$g$, $g$, are nuts on wires G and these nuts are turned to and against the faces D' of the block D, when said block is inserted on the rim B so that said wires G may be tightened onto the cables F. By means of the wires G the cables F may be drawn closely to rubber band C, and the tightening of the wires G also draws the block D down to rim B so that lip E of said block is held tightly in place on the ends of the cables F which abut against said block underneath said lip E. The several cables F are laid closely together on the rubber band C which is on the wheel provided with this tire, completely covering the rubber band and protecting it from wear.

The tire constructed as described is particularly adapted for use on the propelling wheels of trucks, usually the rear wheels, the cable F being placed transversely to increase the traction of the wheels.

It will be obvious that a tire constructed as described is dependent, so far as its resiliency is concerned, on the rubber band C and a quantity and quality of rubber is used in said band to obtain the desired resiliency, and by reason of said rubber being protected by cable F, what is known as soft or resilient rubber may be used.

I claim:—

A vehicle tire comprising a rim provided with annular flanges and provided with apertures, blocks provided with a groove and with apertures, and provided with an overhanging lip on one side thereof, said blocks arranged to fit on the rim and to extend through the apertures in the rim, a rubber band arranged to fit the rim, a cover consisting of metal pieces provided with bends adjacent to their ends, and extending transversely across the rubber bands, and wires over the ends of the metal pieces, and means to secure the ends of the wires in the blocks; said blocks arranged so that the overhanging lips thereon cover the ends of the metal pieces which abut against said blocks.

FREDERICK H. LATHROP.

In the presence of—
CHARLES TURNER BROWN,
CORA A. ADAMS.

Copies of this patent may be obtained for five cents each, by addressing the "Commissioner of Patents, Washington, D. C."